US012662183B2

(12) United States Patent
Ruh et al.

(10) Patent No.: US 12,662,183 B2
(45) Date of Patent: Jun. 23, 2026

(54) STEERING UNIT FOR A STEER-BY-WIRE STEERING SYSTEM OF A MOTOR VEHICLE

(71) Applicants: SCHAEFFLER TECHNOLOGIES AG & CO. KG, Herzogenaurach (DE); WILLI ELBE GELENKWELLEN GMBH & CO. KG, Tamm (DE)

(72) Inventors: Fabian Ruh, Erlangen (DE); Ralf Sedlmeier, Pleidelsheim (DE); Jörg Hauhoff, Altdorf (DE); Thomas Herrlich, Ottobrunn (DE); Thomas Gerlach, Weinsberg (DE)

(73) Assignees: SCHAEFFLER TECHNOLOGIES AG & CO. KG, Herzogenaurach (DE); WILLI ELBE GELENKWELLEN GMBH & CO. KG, Tamm (DE)

( * ) Notice: Subject to any disclaimer, the term of this patent is extended or adjusted under 35 U.S.C. 154(b) by 330 days.

(21) Appl. No.: 18/687,986

(22) PCT Filed: Sep. 7, 2022

(86) PCT No.: PCT/EP2022/074779
§ 371 (c)(1),
(2) Date: Feb. 29, 2024

(87) PCT Pub. No.: WO2023/036790
PCT Pub. Date: Mar. 16, 2023

(65) Prior Publication Data
US 2025/0121873 A1      Apr. 17, 2025

(30) Foreign Application Priority Data
Sep. 9, 2021      (DE) ..................... 10 2021 123 383.6

(51) Int. Cl.
B62D 5/00          (2006.01)
B62D 5/04          (2006.01)
(52) U.S. Cl.
CPC ........... *B62D 5/001* (2013.01); *B62D 5/0445* (2013.01)
(58) Field of Classification Search
CPC .............................. B62D 5/001; B62D 5/0445
(Continued)

(56) References Cited

U.S. PATENT DOCUMENTS

2018/0238377 A1      8/2018   Kim et al.
2021/0222759 A1*     7/2021   Bonkowski ............ B62D 5/001
(Continued)

FOREIGN PATENT DOCUMENTS

DE          10017049 A1    11/2000
DE          10157797 A1     9/2002
(Continued)

OTHER PUBLICATIONS

International Search Report (English and German) and Written Opinion of the ISA (German) issued in PCT/EP2022/074779, mailed Jan. 18, 2023; ISA/EP.
Communication under Article 94(3) issued in EP Application No. 22 777 952.7, mailing date: Jun. 24, 2025.
(Continued)

*Primary Examiner* — Erick R Solis
(74) *Attorney, Agent, or Firm* — Harness, Dickey & Pierce, PLC

(57)          ABSTRACT
The disclosure relates to a steering unit for a steer-by-wire steering system of a motor vehicle, having a steering shaft which can be rotated by a driver, and a spindle drive which interacts with the steering shaft to limit a steering angle of the steering shaft, wherein the spindle drive has a spindle and a spindle nut screwed onto the spindle, wherein the spindle nut is displaceable with a movement component in the axial direction relative to the spindle when the spindle is (Continued)

Figure 5:
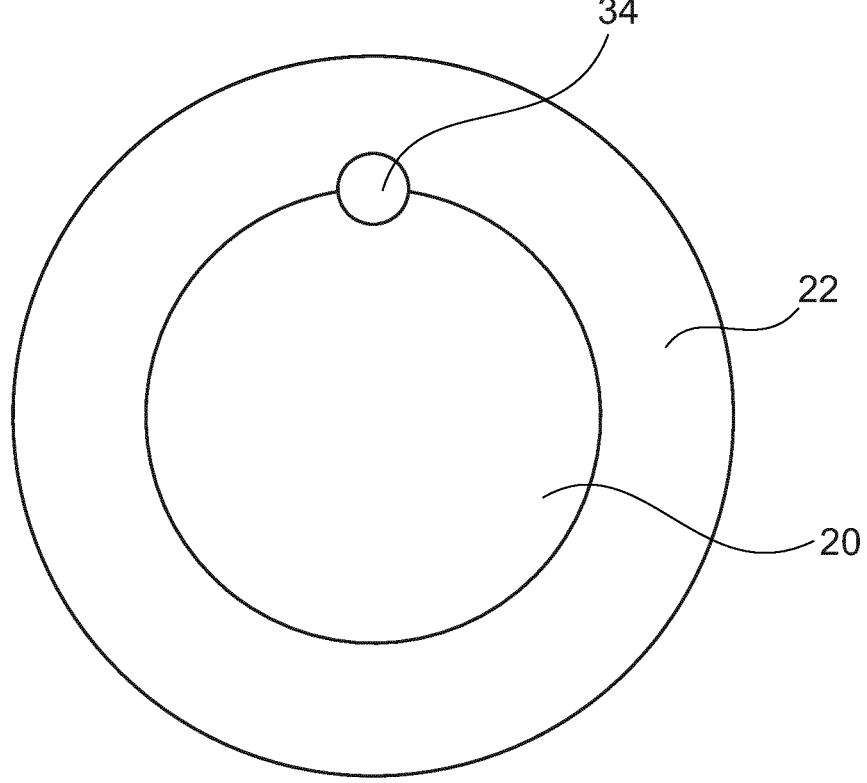

rotated, wherein the spindle nut has a first spindle stop for tangentially striking against a first end stop fixed to the spindle, wherein the first end stop is formed integrally with the spindle. The number of components is thus reduced, and the structure of the steering unit is simplified, as a result of which the effort for production and assembly is reduced, and cost-effective production of the steering unit is made possible.

10 Claims, 2 Drawing Sheets

(58) Field of Classification Search
USPC ................................................ 180/402, 444
See application file for complete search history.

(56) References Cited

U.S. PATENT DOCUMENTS

| | | | |
|---|---|---|---|
| 2022/0128134 A1 | 4/2022 | Bonkowski et al. | |
| 2022/0227413 A1* | 7/2022 | Bergmann | B62D 5/006 |
| 2025/0242852 A1* | 7/2025 | Melsa | B62D 1/181 |
| 2025/0369504 A1* | 12/2025 | Ebke | B62D 5/001 |

FOREIGN PATENT DOCUMENTS

| | | |
|---|---|---|
| DE | 102014209646 A1 | 11/2015 |
| DE | 102018103963 A1 | 8/2018 |
| DE | 102020128101 A1 | 7/2021 |
| EP | 3620350 A1 | 3/2020 |
| KR | 20210021712 A | 3/2021 |

OTHER PUBLICATIONS

Hiwin GmbH: Dec. 11, 2018 (Dec. 11, 2018), URL:https://www.youtube.com/watch?v=yUc0JAKEkTk.

* cited by examiner

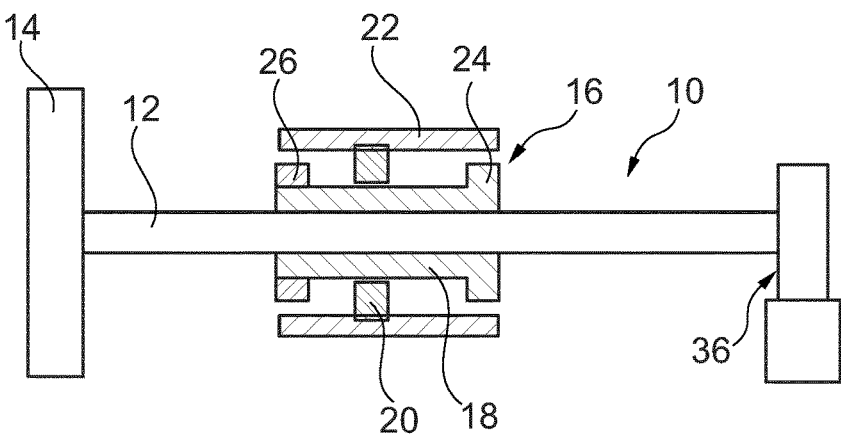
Fig. 1
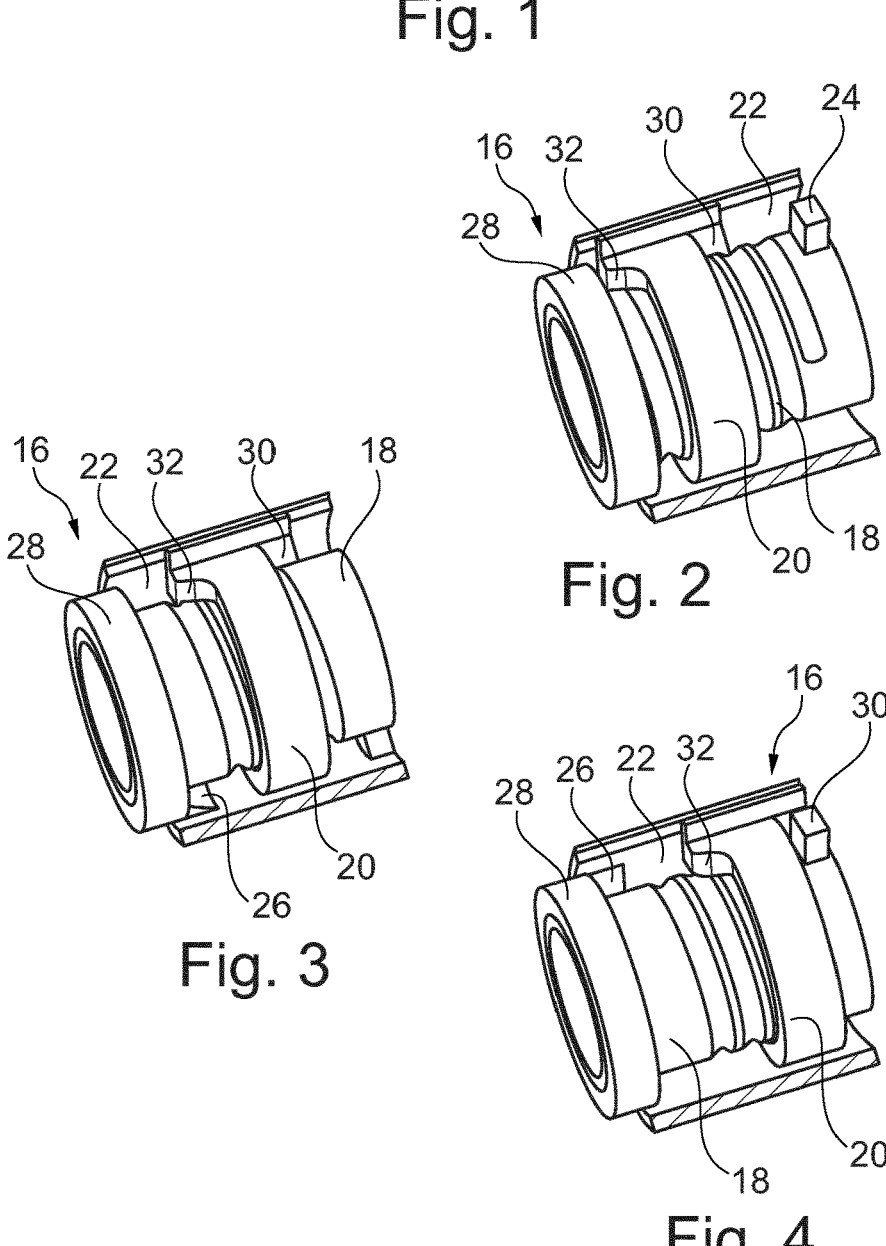
Fig. 2
Fig. 3
Fig. 4

STEERING UNIT FOR A STEER-BY-WIRE STEERING SYSTEM OF A MOTOR VEHICLE

CROSS-REFERENCE TO RELATED APPLICATIONS

This application is a U.S. National Phase Application under 35 U.S.C. 371 of International Application No. PCT/EP2022/074779, filed on Sep. 7, 2022, which claims the benefit of German Patent Application No. 10 2021 123 383.6, filed on Sep. 9, 2021. The entire disclosure of the above German patent application is incorporated herein by reference.

FIELD

The disclosure concerns a steering unit for a steer-by-wire steering system of a motor vehicle, via which a turn angle can be easily limited.

BACKGROUND

This section provides background information related to the present disclosure which is not necessarily prior art.

Steer-by-wire steering systems for motor vehicles, like conventional mechanical steering systems, receive manual steering commands from the driver through an input unit. This may be done for example by turning a steering wheel which is rotationally fixedly connected to a steering shaft of a steering unit. The steering shaft however is not necessarily mechanically connected via a steering gear to the wheels to be steered, but may cooperate with sensors for turn angle or torque. These sensors detect the input steering commands and output an electrical control signal determined therefrom to a wheel steering system, which sets a corresponding steering deflection of the wheels by means of an electric actuating drive.

In steer-by-wire steering systems, the driver receives no direct physical feedback from the steered wheels via the steering linkage to the steering wheel. In a purely mechanical, conventional steering system, the maximum number of steering wheel revolutions is established mechanically, since the steering wheel cannot be turned further once the wheel steering system has turned the wheels as far as a stop which defines the maximum steering deflection. Since, in a steer-by-wire steering system, a mechanical stop of the wheels on reaching the maximum steering deflection cannot be haptically perceived by the driver via a direct mechanical coupling, in the steering unit for the steer-by-wire steering system of the motor vehicle, the maximum steering deflection must be simulated by a mechanical turn angle limitation.

DE 10 2018 103 963 A1 describes a mechanical turn angle limitation for a steering unit of a steer-by-wire steering system for a motor vehicle in which a spindle, connected to a steering shaft of a steering wheel, displaces in the axial direction a spindle nut screwed thereon, wherein in its axial end positions, the spindle nut can strike tangentially against end stops formed by discs attached to the spindle.

There is a continuous need for designing a steering unit for a steer-by-wire steering system of a motor vehicle which is as simple and economical as possible.

SUMMARY

This section provides a general summary of the disclosure, and is not a comprehensive disclosure of its full scope or all of its features.

It is the object of the disclosure to indicate measures which provide a simple and economic steering unit for a steer-by-wire steering system of a motor vehicle.

One embodiment concerns a steering unit for a steer-by-wire steering system of a motor vehicle, with a steering shaft which can be turned by a driver, and a spindle drive which cooperates with the steering shaft to limit a steering angle of the steering shaft, wherein the spindle drive has a spindle and a spindle nut screwed onto the spindle, wherein the spindle nut is displaceable relative to the spindle with a movement component in the axial direction when the spindle is rotated, wherein the spindle nut has a first spindle stop for tangentially striking against a first end stop fixed stationarily to the spindle, wherein the first end stop is formed integrally with the spindle.

Since no mechanical coupling of the steering unit to the wheels of the motor vehicle via a steering gear is required in a steer-by-wire steering system, it is possible to make the steering shaft shorter and more compact than in a purely mechanical steering system. This allows the spindle drive to be pushed onto the free end of the steering shaft and in particular connected to the steering shaft via the spindle. Here, the spindle drive can very easily be connected to the steering shaft since, because of the lack of mechanical coupling to the wheels, correspondingly less complexity is required in mounting the steering shaft, and only few components are provided surrounding the steering shaft on the radial outside. This in turn allows the first end stop on the spindle side, for limiting the maximum turn angle in a first rotational direction, to be formed integrally with the spindle, and allows the omission of a separate disc attached to the spindle via a separate fixing system in order to form the first end stop. The number of components is thereby reduced and the structure of the steering unit simplified, whereby the complexity of production and mounting is reduced and the steering unit can be produced at low cost.

The spindle may have at least one spindle groove running in a helix along an axial longitudinal direction of the spindle, via which the spindle nut is guided on the spindle and can be displaced with a movement component in the axial direction. Depending on design of the spindle drive, in particular as a ball-screw drive, the spindle may be formed by a forming process, in particular pressing, with three-dimensionally shaped molds, and/or by material removal in order to form the spindle groove, wherein the first end stop formed integrally with the spindle can be produced at the same time as the spindle groove. The spindle, produced from a semifinished product in its three-dimensional design, including its spindle groove and the integral first end stop, can be produced easily and cheaply during the machining which is then performed.

The spindle nut, screwed directly or indirectly onto the spindle, may be displaced in the axial direction relative to the spindle when the spindle is rotated relative to the spindle nut. Preferably, the spindle nut is held rotationally fixedly so that the spindle nut can be moved exclusively in the axial direction, while the rotatable spindle is immovable in the axial direction. When the driver turns the steering wheel connected to the steering shaft in a first rotation direction, the steering shaft and spindle also turn in the first rotation direction, whereby the spindle nut is moved on the spindle in the axial direction to the first end stop, which co-rotates with the spindle, until, when the predefined maximum steering deflection is reached, the first spindle stop of the spindle nut strikes tangentially against the first end stop of the spindle and a haptically perceptible signal can be sent to the driver indicating that the maximum steering deflection is reached. Because of the tangential striking of the first spindle stop of the spindle nut on the first end stop of the spindle, the spindle nut can easily move away from the first end stop when the steering wheel connected to the steering shaft is turned in the opposite, second rotation direction. Seizing of the end stop between two axial sides is avoided, so that good steerability is retained.

Since the first end stop is formed integrally with the spindle, and the first end stop may extend comparatively far in the circumferential direction pointing away from the first spindle stop, the first end stop can tolerate comparatively high forces. This allows the first end stop to be provided over a comparatively large radius region so that, for the first end stop of the spindle striking against the first spindle stop of the spindle nut, a comparatively large lever arm may result with a correspondingly large force translation. Despite a particularly freely moving steering shaft, when the maximum steering deflection is reached, a comparatively high counter-force may be provided which, with a particularly compact steering unit, can provide a good haptic simulation of a purely mechanical steering unit. In relation to a diameter d of the steering shaft inside the spindle, a mean diameter D of the contact faces between the first end stop and the first spindle stop, which rest against one another when the maximum steering deflection is reached, may amount to $1.10 \leq D/d \leq 2.50$, in particular $1.30 \leq D/d \leq 2.25$, preferably $1.50 \leq D/d \leq 2.00$, and particularly preferably $D/d = 1.85 \pm 0.05$.

In particular, a second end stop formed separately from the spindle is rotationally fixedly attached to the spindle and axially spaced from the first end stop. Starting from a neutral middle position, which in particular corresponds to a straight-ahead travel of the motor vehicle, the maximum steering deflection in the first rotational direction of the steering wheel and the steering shaft coupled to the steering wheel may be limited by the first end stop, and in the opposite second rotational direction by the second end stop. Preferably, the maximum turn angle of the steering shaft, starting from the neutral middle position, in the first rotational direction is substantially exactly the same as the maximum turn angle of the steering shaft, starting from the neutral middle position, in the second rotational direction. The first end stop may strike against the spindle nut by form fit, in particular tangentially, when the maximum steering deflection is reached in the second rotational direction. The spindle nut is preferably received captively between the first end stop and the second end stop, so that a maximum displacement travel of the spindle nut in the axial direction may be predefined and limited by the first end stop and the second end stop. The maximum steering angle may be set by the axial distance of the second end stop, separately attached to the spindle, from the first end stop formed integrally with the spindle, and be used for different maximum steering angles of different steer-by-wire steering systems by means of the same steering unit. The number of same parts may be increased beyond different model variants of a motor vehicle, whereby the production and storage costs may be reduced. For example, the first end stop and the second end stop have an axial spacing which, for the spindle drive, predefines a maximum total steering angle of 270° to 1080°, in particular 540° to 1035°, preferably 540° to 810°, and particularly preferably 540° to 630°.

Preferably, the second end stop is part of a stop ring which is pushed onto the spindle and rotationally fixedly attached to the spindle. The stop ring may be pushed onto the steering shaft and/or the spindle at the axial end pointing away from the first stop. The stop ring may be pushed onto the steering shaft and/or the spindle at the axial end pointing away from the first end stop and attached to the spindle on the radial outside of the spindle. The spindle drive can easily and quickly be mounted inside the steering unit with a small number of components if the first end stop protrudes as one piece from the remainder of the spindle. Since the stop ring is pushed onto the spindle, no fixing system need be provided on the steering shaft for securing the stop ring. Instead, the fixing system for the stop ring may be provided exclusively in the spindle drive. The stop ring may be pressed onto the spindle, in particular with a press fit. This allows the stop ring to absorb a force in the radial direction, by means of which a fixing of the spindle to steering shaft may be supported. Instead of reducing the strength of the steering shaft for fixing the stop ring, the stop ring pushed onto the spindle may even improve the stability and strength of the steering shaft and steering unit.

It is particularly advantageous if the first stop is provided integrally with the spindle and the second end stop is not integral with the spindle and/or is provided separately from the spindle. It is advantageous if an end stop formed integrally with the spindle is provided only at one end of the spindle, i.e. if only the first end stop is formed integrally with the spindle, and/or no other/second end stop is formed integrally with the spindle. This ensures that at least the first end stop has a high strength, is captively mounted and has a compact construction, and the second end stop allows the steering unit to be mounted even in constricted installation space. Because the end stop is separate or not formed integrally with the spindle, the spindle nut can easily be screwed on with minimum risk of collision.

The first end stop may protrude radially, in particular outwardly, from the spindle. The second end stop may protrude radially, in particular outwardly, relative to a ball of the ball-screw drive of the steering unit and/or a thread turn for a ball of the ball-screw drive of the steering unit. This ensures that the spindle nut need not protrude or only insignificantly protrude radially, in particular inwardly, in order to strike tangentially against the end stop. The spindle nut only protrudes tangentially. Thus the spindle nut may be designed more compactly and be pushed onto the spindle opposite the first end stop.

The spindle stop, in particular a/the first spindle stop and/or a/the second spindle stop may be formed integrally with the spindle nut and/or with a portion/part of the spindle nut at least partially radially surrounding spindle. The spindle stop may protrude axially for tangentially striking against the spindle nut.

Preferably, the stop ring is rotationally secured to the spindle by form fit against a twist relative to the spindle, preferably wherein the stop ring is axially displaceable relative to the spindle, and preferably an axial displaceability of the stop ring relative to the spindle is limited and/or minimized by a locking element, in particular a lock ring, connected to the spindle or the steering shaft, and a shoulder formed on the spindle. Particularly preferably, the stop ring is rotationally secured on the spindle by form fit against a twist relative to the spindle, wherein the stop ring is axially displaceable relative to the spindle and an axial displaceability of the stop ring relative to the spindle is limited and/or minimized by a locking element, in particular a locking ring, connected to the spindle or the steering shaft, and a shoulder formed by the spindle. The stop ring may for example be supported on the spindle and rotationally secured via splines and/or a shaft/hub connection. The stop ring need not however be clamped play-free in the circumferential direction, since on reaching the maximum steering deflection a perceptible feedback is to be generated, which is even supported by an audible striking sound which in this particular situation is not considered undesirable. Alternatively, the striking sound may be damped by a damping element provided between the stop ring and spindle, in particular an elastomer material. Because of the fundamental axial displaceability, the stop ring can easily be pushed, rotationally securely, onto a corresponding outer contour of the spindle by an axial movement relative to the spindle. An engagement depth of the stop ring can easily be limited by a shoulder formed on the outer contour of the spindle, which may form an axial stop for the stop ring. The stop ring can be prevented from falling off the spindle in axial direction opposite the engagement direction by a lock ring inserted in a groove of the spindle or steering shaft. Preferably, the lock ring is inserted in the steering shaft and can block both an axial movement of the stop ring relative to the steering shaft, and also an axial movement of the spindle relative to the steering shaft, and form a corresponding axial stop.

In particular, the spindle nut has a second spindle stop, axially spaced from the first spindle stop, for tangentially striking on a/the second end stop which is stationarily fixed to the spindle. Since the first spindle stop, cooperating with the first end stop, and the second spindle stop, cooperating with the second end stop, are spaced apart from one another in the axial direction, it is easily possible to form a guide and/or coupling of the spindle nut with the spindle in the axial space between the first spindle stop and the second spindle stop, wherein this guide may in particular be optimized with respect to friction and/or frictional fluctuations. It is not necessary to use the same spindle stop of the spindle nut for tangentially striking both against the first end stop and also against second end stop. For example, the spindle nut may have an attachment protruding in the axial direction at each axial end face and forming the respective spindle stop at a side face pointing in the tangential direction. The attachment protruding in the axial direction may extend further in the circumferential direction pointing away from the respective spindle stop, for example as a ramp, and transform into the axial end face of the remaining spindle nut which is offset to the spindle stop in the axial direction, so that even high impact forces can be absorbed by the respective spindle stop without significant plastic deformation of the spindle stop.

Preferably, the spindle drive is configured as a ball-screw drive, wherein the spindle nut is guided on the spindle via at least one ball. The ball-screw drive, which may also be described as a recirculating ball spindle, may provide a helical guide of the spindle nut on the spindle, similar to a linear ball bearing, by means of balls guided in grooves of the spindle and spindle nut and with running and frictional properties comparable to those of a ball bearing. This leads to good running smoothness of the steering shaft with a particularly low friction in the region of the spindle drive providing a turn angle limitation. A deterioration in steering feeling due to the spindle drive can thereby be avoided.

Preferably, the spindle nut has at least two thread turns for guidance on balls of the ball-screw drive. Preferably, the spindle nut has at least two thread turns for guidance on balls of the ball-screw drive, wherein the spindle nut has at least one ball deflector for returning balls arriving from one thread turn into the same thread turn or a different thread turn. The balls which are no longer required, depending on rotational position of the spindle nut relative to the spindle, may thereby be reused after passing the ball deflector. If the ball deflector leads back to the same thread turn, this may constitute redundant guidance of the spindle nut on the spindle which, even on damage or component failure in one of the thread turns, still allows steering movements via the guidance of the other thread turn. If the ball deflector leads into another thread turn, the loads on the balls at great steering deflections are distributed more evenly so that premature wear phenomena may be avoided.

In particular, the spindle nut is rotationally secured on an in particular stationary guide. Co-rotation of the spindle nut when the steering shaft is turned by a steering deflection applied by the driver at the steering wheel may thereby be reliably avoided. For this, the spindle nut may be guided linearly by form fit in the axial direction parallel to the rotational axis of the spindle, for example by a tongue and groove connection with play fit.

Preferably, the spindle nut is rotationally secured indirectly on the guide by form fit. For example, the spindle nut has a guide tab which is formed integrally with the spindle nut and linearly guided in the axial direction in a corresponding slot of the fixed guide. It is however also possible that the fixed guide has at least one protruding rib which is linearly guided in the axial direction in a groove in the spindle nut. For example multiple, e.g. two to five, ribs may be provided. The number of components is thereby kept low.

In a further embodiment, the spindle is rotationally secured indirectly on the guide via precisely one, or at least two feather keys, in particular configured as needles. The spindle nut and the fixed guide may each have a groove which is continuous in particular in the axial direction and in which the feather key can be and/or is inserted. Thus on mounting, a twist of the spindle nut relative to the guide is permitted and is ended only after insertion of the at least one feather key. After insertion and/or by the presence of the further key, a rotational locking of the spindle nut on the guide is formed. Mounting of the spindle nut is simplified if the guide is already installed.

Further areas of applicability will become apparent from the description provided herein. The description and specific examples in this summary are intended for purposes of illustration only and are not intended to limit the scope of the present disclosure.

DRAWINGS

The drawings described herein is for illustrative purposes only of selected embodiments and not all possible implementations, and are not intended to limit the scope of the present disclosure.

The disclosure is described in more detail below as an example with reference to the appended drawings showing preferred exemplary embodiments, wherein the features illustrated below may constitute aspects of the disclosure both individually and in combination. In the drawings:

FIG. 1: shows a schematic, principle illustration of the steering unit,

FIG. 2: shows a schematic, perspective view of a spindle drive for the steering unit from FIG. 1 in a first position, FIG. 3: shows a schematic, perspective view of a spindle drive from FIG. 2 in a second position, FIG. 4: shows a schematic, perspective view of a spindle drive from FIG. 2 in a third position, and FIG. 5: shows a schematic sectional view of the spindle drive from FIG. 2.

DETAILED DESCRIPTION

Example embodiments will now be described more fully with reference to the accompanying drawings.

The steering unit 10 shown in FIG. 1 may be used for a steer-by-wire steering system of a motor vehicle. The steering unit 10 may have a steering wheel 14 which is coupled, in particular rotationally fixedly attached, to the steering shaft 12 and which a driver may turn, for cornering, from a neutral middle position corresponding to straight-ahead travel. The steering shaft 12 may interact with an actuator 36 which can provide active feedback for the driver. The actuator may comprise a motor for providing a torque, in some cases an intermediate gear and/or a sensor 36 which detects for example a turn angle, a torque, a turn angle acceleration, in order on the basis of the detected measurement values to cause a steering deflection of wheels of the motor vehicle and/or provide active feedback. A spindle drive 16 is coupled to the steering shaft 12 and has a spindle 18, rotationally fixedly attached to the steering shaft 12 and configured as a hollow shaft, and a spindle nut 20 screwed onto the spindle 18 and guided on the spindle 18 in the axial direction. The spindle nut 20 is rotationally secured by form fit on a fixed guide 22 and guided linearly so as to be relatively movable in the axial direction. When the spindle 18 co-rotates on turning of the steering wheel 14 and steering shaft 12, the rotational movement of the spindle 18 is converted into an axial linear movement of the spindle nut 20. The maximum axial relative movement of the spindle nut 20 and hence a maximum turn angle of the steering shaft 12 may be limited by the spindle nut 20 striking against a first end stop 24 formed integrally with the spindle 18 and a separately formed second end stop 26 rotationally fixedly attached to the spindle.

As shown in FIG. 2, the second end stop 26 may be part of a stop ring 28 which is pushed onto the spindle 18 and may be attached rotationally fixedly to the spindle 18 as a separate component. As shown in FIG. 3, the spindle nut 20 may have a first spindle stop 30 which can strike against the first end stop 24, as illustrated in FIG. 4. Also, the spindle nut 20 may have a second spindle stop 32 which can strike against the second end stop 26, as shown in FIG. 2. The spindle drive 16 is configured in particular as a low-friction ball-screw drive.

In particular, the spindle nut 20 is guided on the spindle 18 via at least one ball. In particular, the spindle 20 has at least two thread turns for guidance on balls of the ball-screw drive. In particular, the spindle nut 20 has at least two thread turns for guidance on balls of the ball-screw drive, in particular wherein the spindle nut 20 has at least one ball deflector for return of balls arriving from one thread turn into the same thread turn or a different thread turn.

The first end stop 24 and/or the second end stop 26 protrude in particular radially outwardly from the spindle 18. The first end stop 24 and/or the second end stop 26 protrude in the radial direction and/or outwardly over a thread turn for a ball of the ball-screw drive of the steering unit 10.

The first end stop 24 is formed integrally with the spindle 18. The second end stop 26 is not formed integrally with the spindle 18, and/or is provided separately from the spindle. In particular, an end stop 24 formed integrally with the spindle 18 is provided only at one end of the spindle 18 (on the right in FIGS. 2 to 4). There is no further end stop 24, 26 formed integrally with the spindle 18.

In particular, the first spindle stop 30 and/or the second spindle stop 32 are formed integrally with a portion/part of the spindle nut 20 radially surrounding the spindle 18.

The first spindle stop 30 and/or the second spindle stop 32 protrude axially on the spindle nut 20 for tangentially striking against the first end stop 24 and/or the second end stop 26.

As shown in FIG. 5, the spindle nut 20 may be guided on the guide 22 via a tongue and groove connection so be rotationally secured but axially relatively displaceable. In the exemplary embodiment shown, the feather key of the tongue and groove connection is configured as a needle 34.

The foregoing description of the embodiment has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A steering unit for a steer-by-wire steering system of a motor vehicle, comprising:
    a steering shaft which can be turned by a driver, and
    a spindle drive which cooperates with the steering shaft to limit a steering angle of the steering shaft,
    wherein the spindle drive has a spindle and a spindle nut screwed onto the spindle, wherein the spindle nut is displaceable relative to the spindle with a movement component in the axial direction when the spindle is rotated,
    wherein the spindle nut has a first spindle stop for tangentially striking against a first end stop fixed stationarily to the spindle,
    wherein
    the first end stop is formed integrally with the spindle.

2. The steering unit as claimed in claim 1, wherein a second end stop, which is formed separately from the spindle, is rotationally fixedly attached to the spindle and axially spaced from the first end stop.

3. The steering unit as claimed in claim 2, wherein the second end stop is part of a stop ring which is pushed onto the spindle and rotationally fixedly attached to the spindle.

4. The steering unit as claimed in claim 3, wherein the stop ring is rotationally secured to the spindle by form fit against a twist relative to the spindle, wherein the stop ring is axially displaceable relative to the spindle, and an axial displaceability of the stop ring relative to the spindle is limited and/or minimized by a locking element, in particular a lock ring, connected to the spindle or the steering shaft, and a shoulder formed on the spindle.

5. The steering unit as claimed in claim 1, wherein the spindle nut has a second spindle stop axially spaced from the first spindle stop for tangentially striking on a/the second end stop which is stationarily fixed to the spindle.

6. The steering unit as claimed in claim 1, wherein the spindle nut is rotationally secured on an in particular stationary guide.

7. The steering unit as claimed in claim 6, wherein the spindle nut is rotationally secured directly to the guide by form fit.

8. The steering unit as claimed in claim 1, wherein the spindle drive is configured as a ball-screw drive, wherein the spindle nut is guided via at least one ball on the spindle.

9. The steering unit as claimed in claim 8, wherein the spindle nut has at least two thread turns for guidance on balls of the ball-screw drive, wherein the spindle nut has at least one ball deflector for returning balls arriving from one thread turn into the same thread turn or a different thread turn.

10. The steering unit as claimed in claim 8, wherein the spindle nut is rotationally secured indirectly on the guide via precisely one, or at least two feather keys, in particular configured as needles.

\* \* \* \* \*